United States Patent [19]

Giuffrida

[11] 4,298,442

[45] Nov. 3, 1981

[54] ELECTRODIALYSIS PROCESS FOR SILICA REMOVAL

[75] Inventor: Anthony J. Giuffrida, North Andover, Mass.

[73] Assignee: Ionics, Incorporated, Watertown, Mass.

[21] Appl. No.: 175,098

[22] Filed: Aug. 4, 1980

[51] Int. Cl.$^3$ .............................................. B01D 13/02
[52] U.S. Cl. ................................ 204/180 P; 204/101; 204/301; 423/335
[58] Field of Search .................... 204/180 P, 301, 101; 423/333, 335

[56] References Cited

U.S. PATENT DOCUMENTS

| | | |
|---|---|---|
| 4,124,471 | 11/1978 | Lieb et al. ........................ 204/180 P |
| 4,144,158 | 3/1979 | Nagasubramanian et al. ... 204/180 P |
| 4,147,605 | 4/1979 | Schenker et al. ................ 204/180 P |
| 4,203,822 | 5/1980 | Schenker et al. .................... 204/301 |

Primary Examiner—Arthur C. Prescott
Attorney, Agent, or Firm—Norman E. Saliba

[57] ABSTRACT

A process for the removal of silica from an aqueous solution is disclosed in which the pH of the solution is adjusted to at least about 9.5 and then passed through a conventional electrodialysis cell to effect ionic transfer of the silica out of solution.

7 Claims, No Drawings

ELECTRODIALYSIS PROCESS FOR SILICA REMOVAL

BACKGROUND OF THE INVENTION

1. Field of the Invention

The invention relates to the removal of minerals, particularly silica, from water.

2. Description of the Prior Art

Removal of silica, a weakly ionized salt, from aqueous solutions as a final step in purification has heretofore been a difficult and costly process achieved principally by the use of strongly basic anion exchange resins in the hydroxyl (OH) form. The resin particles or beads are ordinarily arranged in a column configuration through which the solution is filtered. The resins require frequent regeneration as they become exhausted through use.

In an improved alternate approach, U.S. Pat. No. 3,149,061, Parsi, (which is expressly incorporated herein by reference;) discloses a method in which ion exchange resin particles are disposed in the fluid flow chambers formed by an arrangement of alternating anion and cation permeable membranes in an electrodialysis cell providing a combination of resin exchange and electrodialysis treatment. In addition to promoting the electrodialysis transfer of silica, the resin particles are self-regenerated by the action of the cell in splitting water into $H^+$ and $OH^-$ and therefore does not require a separate regeneration step.

It has now been discovered that by adjusting the pH of the subject solution, silica removal may be carried out in a conventional electrodialysis cell without any use of resin particles; completely eliminating the need for such material and any requirement for specially designed electrodialysis cells containing the resin particles.

The most simple electrodialysis cell comprises a cathode at one terminal end, an anode at the opposite end, and at least two ion permeable membranes. One membrane is selectively cation permeable, and the other anion permeable, and together form a diluting (desalting) chamber therebetween. As is well known, commercial electrodialysis cells are most often comprised of many alternating pairs of cation and anion permeable membranes forming a plurality of salt diluting and salt concentrating chambers. Direct current is supplied between the anode and cathode. In the present invention it is preferable that the solution to be treated is substantially free of strongly ionized salts (such as NaCl) preferably less than 200 ppm. The substantially desalted solution still containing silica as silicic acid is then passed into the diluting chambers together with a sufficient quantity of a hydroxide, preferably NaOH, to raise the pH to at least about 9.5 but preferably not greater than 11.5. As described above, silica now in the anion form will migrate out of the feed (dilute) stream through the anion membrane and the sodium cation will migrate out of the feed stream through the cation membrane; the ions eventually ending up in the concentrating (waste) stream.

It has been found that too high a pH will result in decreased removal of silica due to competition from excess hydroxyl anions. An upper pH limit of about 11.5 has been discovered as the value at which the efficiency of the silica removal process begins to decline.

Although NaOH is the preferred agent for increasing the pH, other compounds such as $NH_4OH$ and KOH have been found to promote transfer as well. Additionally, the efficiency of the process is increased it the anion membranes are first placed or equilibrated into the hydroxyl form prior to initiation of the process. This conditioning of the anion membrane into the hydroxyl form will naturally evolve through cell operation, however, so such a prior step is not essential to the process.

SUMMARY OF THE INVENTION

The invention may be summarized as a process for removing silica, i.e. silicon dioxide ($SiO_2$) from aqueous solutions using conventional electrodialysis treatment by adjusting the pH of the feed solution to at least about 9.5. This may be accomplished preferably by the introduction of sodium hydroxide or alternately other suitable hydroxides.

Prior electrodialysis treatment of the solution may be required to substantialy remove the more strongly ionized salts if such exist in the subject liquid. In the preliminary desalting treatment, the removal of the strongly ionized salts will occur first over the weakly ionized form of silica i.e. silicic acid ($H_2SiO_3$). The result, if such treatment is required, is a solution low in total dissolved salts but still containing the silicic acid. This treatment to remove most of the strongly ionized salts in turn results in the production of an acidic solution due to membrane polarization, i.e. the breakdown of water into hydrogen ($H^+$) and hydroxyl ($OH^-$) ions at the membrane surface; the hydrogen ions being generated in the desalting chambers on the cathode side of the anion membrane. At this low pH invironment, the silica is not ionized due to the high concentration of hydrogen ions in the feed (desalting) chambers thus preventing the further transfer of the silica anions ($HSiO^-_3$) through the anion membrane.

Adjusting the pH level of the feed solution to about 9.5 or above neutralizes the excess hydrogen ions thus resulting in the transfer of the ionizable silica anion through the anion membrane and the associated cations through the cation membrane.

The process of the invention will be more fully understood from the description of the preferred embodiment which follows.

DESCRIPTION OF THE PROCESS

An electrodialysis cell suitable for the practice of the invention is well known in the art and is of the general type described in the hereinbefore mentioned U.S. Pat. No. 3,149,061.

A pair of 9"×10" size electrodialysis stacks were used for the tests summarized in the following examples and each stack contained five cell pairs comprising alternating cation membranes in the sodium form and anion membranes in the hydroxyl form. All test run were made at approximately 20 cm/sec. solution velocity. Silica analysis were performed by using the silicon molybdate method (APHA Standard Methods 14th Edition, 487, 1975) with a DR/2 Hack spectrophotometer.

EXAMPLE 1

(a) A water solution was prepared by adding silicic acid to filtered Watertown, Mass. tap water containing about 50 ppm of dissolved ionized salts of which approximately 2 ppm was $SiO_2$. The feed water now containing a total of 17.5 ppm of $SiO_2$ was adjusted to a pH 10.00 with 1 N.NaOH and run at 2.0 volts per cell pair (V/cp). The objective of the test was to determine the percent silica removal per pass on a two stack (stage) module (i.e. passing the feed water in series flow through one stack or stage and then through the second stack or stage).

The results indicated that the feed water $SiO_2$ content dropped from 17.5 ppm to 10.8 ppm in stage 1 (38% removal) and from 10.8 to 7.5 in stage 2 (29% removal) giving an overall cut of 57%. The pH of the water was adjusted after stage 1 from 7.7 back up to 10.2 and after stage 2 the dilute effluent water exited at a pH of 6.4. The $SiO_2$ content of the concentrate stream increased from 2.2 to 46 ppm.

(b) Run (a) above was repeated except that the feed water was adjusted to a pH of 8.7. The results showed poor removal of silica, i.e. a total removal of only about 8% silica after treatment in two stages.

(c) Run (a) was repeated with the feed water adjusted to a pH of 12.3. This resulted in an overall silica cut of only 29%.

EXAMPLE 2

Prior to this test, an activated carbon filter was added after the 5 micron filter to remove organics and residual chlorine from the tap water. New membranes were put into the stack pair to avoid the possibility that organics or residual chlorine from the previous run would effect the transfer of $SiO_2$. The feed water was made with $Na_2SiO_3.9H_2O$ instead of silica acid because the $Na_2SiO_3.9H_2O$ readily went into solution. A two stage unit was used as in Example 1. At 2 V/cp with the feed water influent adjusted to a pH 10.45, the $SiO_2$ content decreased from 21.4 ppm to 14 ppm in stage 1 and to 10.2 ppm in stage 2 for an overall cut of 52%. After Stage 1 the pH of the effluent from the diluting chambers was adjusted from 8.9 to 10.5. The dilute effluent from stage 2 had a pH of 7.9.

EXAMPLE 3

In this test the feed water was prepared as in Example 2, except that the pH was adjusted to 10.7 with concentrated $NH_4OH$. A weak base ($NH_4OH$) was used to determine if it was superior to a strong base for removal of weakly ionized compounds. Normally the highly ionized bases are easily demineralized (removed) leaving the weakly ionized compounds behind. However, the disadvantage of using $NH_4OH$ is that it can create disposal problems since removal of residual ammonium in the product water may require neutralization and an additional stage.

The results at 2.0 V/cp show that the $SiO_2$ content in the dilute stream feed water was reduced from 27 ppm to 10.6 ppm in stage 1 and from 10.6 ppm to 4.0 ppm in stage 2. No interstage pH adjustment was required since the dilute effluent from stage 1 maintained its pH level. The overall $SiO_2$ cut was 85%, which was the best result obtained.

EXAMPLE 4

The feed water for this test which was obtained from Sanibel, Fla. was first desalted down to approximately 150 ppm of strongly ionized salts and then adjusted to a pH of 11.5 with NaOH. The objective in this test was to determine if the higher pH level would enhance $SiO_2$ transfer. No pH adjustment was made between the stages. At 1.0 V/cp the feed water containing 34.5 ppm of $SiO_2$ was reduced to 17 ppm in stage 1 and from 17.0 ppm to 11.9 ppm in stage 2. In a repeat run at 2.0 V/cp the $SiO_2$ content was lowered from 34.5 ppm to 19.6 ppm in stage 1 and from 19.6 ppm to 13.2 ppm in stage 2. The overall cut was 66% at 1.0 V/cp and 62% at 2.0 V/cp, showing that there appears to be no advantage in operating at the higher voltage.

EXAMPLE 5

This examples using Sanibel, Fla., water was a repeat of Example 3 where an 85% $SiO_2$ cut was obtained in two stages. The objective was to compare the synthetic Watertown (50ppm) feed water test run with a test run using Sanibel (150 ppm) water. The feed water was adjusted to a pH 10.45 with concentrated $NH_4OH$ and when operating at 2.0 V/cp the $SiO_2$ was reduced from 30.1 ppm to 16.0 ppm in stage 1 and from 16.0 ppm to 8.0 ppm in stage 2. The overall $SiO_2$ cut was 73%. No interstage pH adjustment was required. Analysis of the product water for $NH_4^+$ showed a residual of 155 ppm. The results of this run indicate that the synthetic feed water and Sanibel water behave in substantially the same manner.

EXAMPLE 6

The run of example 5 was repeated with the feed water adjusted to a pH of 11.5 and with an initial $SiO_2$ concentration of 34.5 ppm. The $SiO_2$ was reduced to 19.6 ppm in stage 1 and down to 13.2 ppm in stage 2 for an overall cut of 62%.

EXAMPLE 7

The run of example 5 was repeated using $Na_2CO_3$ to adjust the feed water pH to 10.5. The object was to determine if $Na_2CO_3$ could be employed for silica removal. At 1 V/cp the $SiO_2$ removal through the two stage totaled 28% i.e. from 30.6 ppm to 22 ppm. The poor cut may be due to the large amount of $Na_2CO_3$ (800 ppm) that was required to adjust the required pH.

What is claimed is:

1. An electrodialysis process for the removal of silica from aqueous solutions in an electrodialysis cell having a cathode chamber at one terminal end, an anode chamber at the opposite terminal end, said chambers containing a cathode and anode respectively the body of the cell as defined by the terminating electrodes comprised of a plurality of alternating silica diluting and silica concentrating-chambers defined by alternating cation and anion permeable membranes, passing said silica containing aqueous solution as a feed solution into said diluting chambers, passing a second feed solution into the concentrating and electrode chambers, passing a direct current across the terminal electrodes and withdrawing separate streams of deionized liquid and ion-enriched liquid from said cell; the improvement comprising adjusting the pH of the silica containing aqueous feed solution to a pH of at least above 9.5 prior to electrodialysis.

2. The process of claim 1 wherein the pH adjustment is made by the addition of a hydroxide solution selected from the group consisting of NaOH, $NH_4OH$, KOH and mixtures of the same.

3. The process of claim 1 wherein the pH is adjusted to no greater than about 12.

4. The process of claim 1 wherein the silica containing feed solution contains no greater than about 200 ppm of strongly ionized dissolved salts therein.

5. The process of claim 1 wherein the anion permeable membranes are in the hydroxyl form prior to the initiation of the electrodialysis process.

6. The process of claim 1 wherein at least the silica diluting chambers contain a fluid permeable filler of anion exchange resin particles.

7. The process of claim 4 wherein the feed solution is treated by electrodialysis to remove strongly ionized salts down to a concentration of about 200 ppm prior to the electrodialysis process for removing the silica.

* * * * *